United States Patent
Grobmeier et al.

(10) Patent No.: US 8,468,790 B2
(45) Date of Patent: Jun. 25, 2013

(54) MACHINE FOR MOWING STALK-LIKE CROPS WITH CONVEYING DISKS

(75) Inventors: Jens Grobmeier, Stadtlohn (DE); Clemens Rickert, Ahaus (DE); Martin Hüning, Billerbeck (DE); Klemens Weitenberg, Borken (DE); Leo Schulze Hockenbeck, Everswinkel (DE); Ralf Robert, Stadtlohn (DE); Mathias Schnelting, Suedlohn (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/176,557

(22) Filed: Jul. 5, 2011

(65) Prior Publication Data
US 2012/0174554 A1    Jul. 12, 2012

(30) Foreign Application Priority Data
Jul. 2, 2010    (DE) .......................... 10 2010 030 857

(51) Int. Cl.
  *A01D 34/00* (2006.01)
(52) U.S. Cl.
  USPC .............................................. 56/500; 56/503
(58) Field of Classification Search
  USPC ................... 56/500, 503, 157, 327.1, 6, 192
  See application file for complete search history.

(56) References Cited

U.S. PATENT DOCUMENTS

| | | | | |
|---|---|---|---|---|
| 2,067,104 A * | 1/1937 | Spell | ................................. | 171/24 |
| 2,556,790 A * | 6/1951 | Berdan | ................................ | 56/2 |
| 2,795,097 A * | 6/1957 | Davidson | .......................... | 56/48 |
| 2,827,751 A * | 3/1958 | Mascaro | .......................... | 56/249 |
| 3,049,854 A * | 8/1962 | Denney | ............................ | 56/12.9 |
| 3,129,549 A * | 4/1964 | Stauffer | ........................... | 56/14.7 |
| 3,871,162 A * | 3/1975 | Schexnayder et al. | ......... | 56/14.3 |
| 4,563,867 A * | 1/1986 | Bokon | ............................. | 56/249 |
| 4,719,743 A * | 1/1988 | Bokon | ............................. | 56/294 |
| 5,546,737 A * | 8/1996 | Moosbrucker | ..................... | 56/94 |
| 5,651,243 A * | 7/1997 | Arnold et al. | ..................... | 56/94 |
| 5,722,225 A * | 3/1998 | Wuebbels et al. | ................. | 56/60 |
| 5,832,707 A * | 11/1998 | Arnold et al. | ..................... | 56/66 |
| 6,000,475 A * | 12/1999 | Fabian et al. | ..................... | 171/58 |
| 6,032,444 A * | 3/2000 | Herron et al. | ..................... | 56/60 |
| 6,105,351 A * | 8/2000 | Itoh | .................................. | 56/235 |
| 6,298,643 B1 * | 10/2001 | Wuebbels et al. | ................. | 56/60 |
| 6,430,907 B2 * | 8/2002 | Wolters et al. | ..................... | 56/64 |
| 7,028,458 B2 * | 4/2006 | Bruening et al. | .................. | 56/51 |
| 8,028,507 B2 * | 10/2011 | Kalverkamp et al. | ........... | 56/103 |
| 2010/0175356 A1 * | 7/2010 | Kalverkamp et al. | ........... | 56/103 |

FOREIGN PATENT DOCUMENTS

EP        1911343 A1 *    4/2008

* cited by examiner

*Primary Examiner* — Árpád Fábián-Kovács

(57) ABSTRACT

A conveyor (16) includes a plurality of conveyor disks (20, 22, 24, 26, 28, 30) that are arranged coaxial to one another and are rotatable about a common central rotational axis, wherein teeth are distributed around the edge of said conveyor disks. A first conveyor disk (20), and a second conveyor disk (22) situated directly adjacent to the first conveyor disk (20), are spaced apart by a smaller axial clearance than that between the second conveyor disk (22) and a third conveyor disk (24) that is situated directly adjacent to the second conveyor disk (22) and arranged on a side of the second conveyor disk (22) that faces away from the first conveyor disk (20).

8 Claims, 1 Drawing Sheet

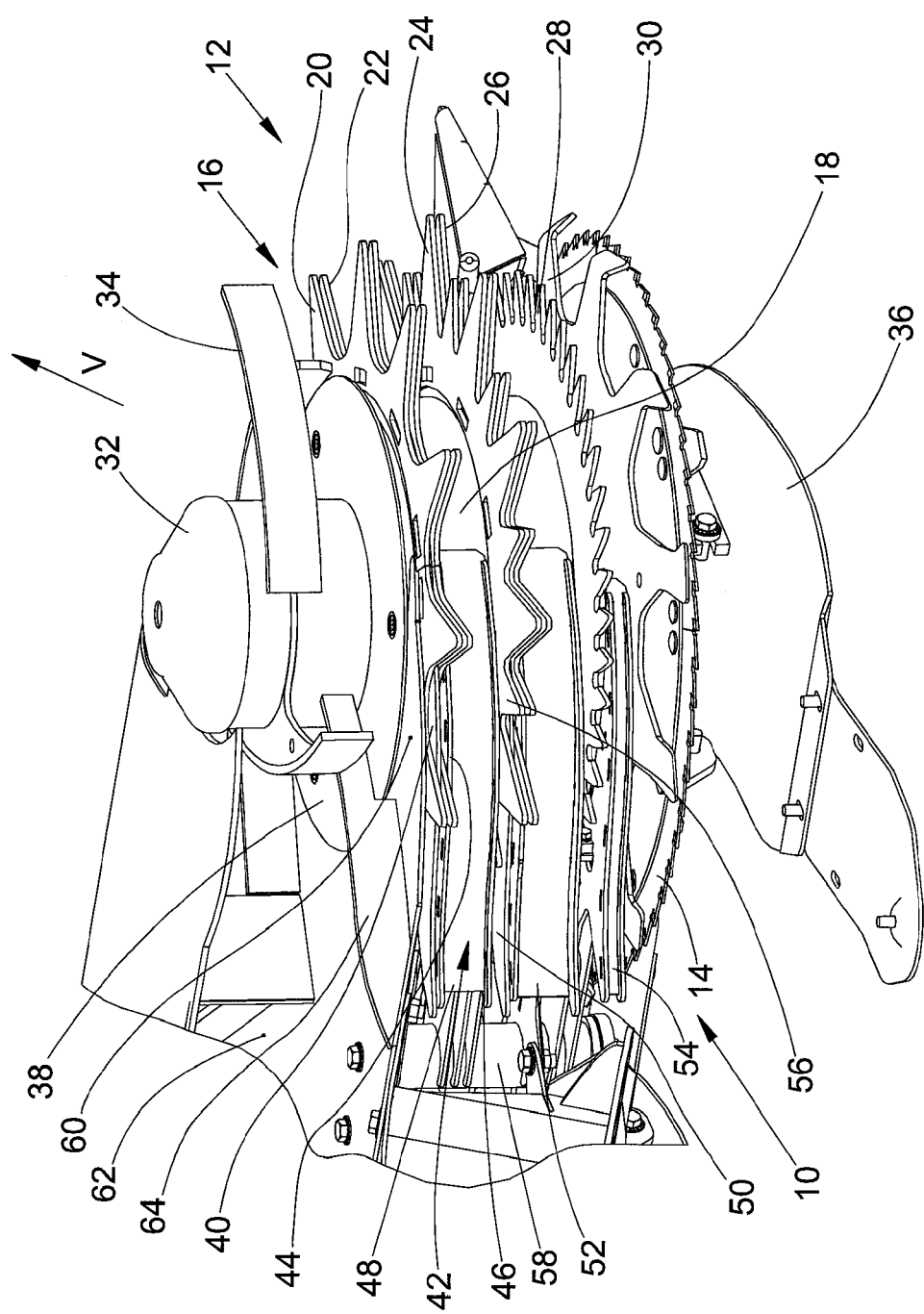

MACHINE FOR MOWING STALK-LIKE CROPS WITH CONVEYING DISKS

FIELD OF THE INVENTION

The invention pertains to a conveyor with a plurality of conveyor disks that are arranged coaxial to one another and can be set in rotation about a common central rotational axis, wherein teeth are distributed around the edge of said conveyor disks.

BACKGROUND OF THE INVENTION

In agriculture, mowing attachments are used in order to cut stalk-like crops such as corn or grain plants off the ground of a field and to transport said plants to a forage harvester that carries the machine and in which the plants are chopped and delivered to a forage box on a trailer. Such mowing attachments feature a plurality of mowing and intake devices that are arranged laterally adjacent to one another and operate independently of rows, namely in the form of conveyor drums that rotate about the vertical axis and feature conveyor disks each having a plurality of teeth distributed around radially outer regions, with adjacent teeth defining intermediate recesses, in which the plant stalks are accommodated, as well as cutting disks that are arranged underneath the conveyor disks and serve for cutting the plant stalks off the ground. In this respect, we refer to the prior art according to DE 10 2006 048 659 A1, in which a plurality of conveyor disks with teeth distributed around their edges are arranged on top of one another on a drum. Strippers engage in the intermediate space between the conveyor disks that are arranged in vertical succession, wherein said strippers are respectively composed of horizontal upper plates, horizontal lower plates and intermediately arranged vertical guide tabs. The strippers remove the crop from the recesses of the conveyor disks; the crop is then transported away by means of additional conveyor drums and/or mowing and intake devices and fed into the intake channel of a forage harvester. DE 195 35 453 A1 shows a similar arrangement of the conveyor disks, but with a rotating stripper that is arranged vertically between the conveyor disks and the rotational axis of which is situated within the enveloping circle of the conveyor disks.

Conveyors with a plurality of conveyor disks that are arranged on a drum at a distance from one another and have teeth distributed around their radially outer regions are also used in devices for harvesting hay, in which they are arranged downstream of a pick-up drum equipped with tines in order to convey the crop into a bale forming chamber of a baling press or the loading area of a forage box. Here too, the conveyor disks usually are spaced equally in each case (DE 100 179 84 A1).

The conveyors of known mowing and intake devices are well suited for harvesting plants with relatively thick stalks such as corn. When harvesting thinner and/or softer plant stalks such as, for example, grains or grasses, the conveying effect frequently proves insufficient because the plants are not adequately supported.

The invention is based on the objective of making available a conveyor that is suitable for a mowing and intake device of a machine for mowing stalk-like crops and that can also convey thinner and/or softer plants in a satisfactory fashion.

SUMMARY OF THE INVENTION

According to the invention, this objective is attained by the arrangement of claim 1, wherein features for realizing additional developments of the solution are disclosed in the other claims.

A conveyor with a plurality of conveyor disks that are arranged coaxial to one another can be set in rotation about a common central rotational axis. The plurality of conveyor disks has teeth distributed around their radially outer regions. The plurality of conveyor disks comprises at least three conveyor disks, two of which are arranged at a relatively small clearance from one another and the third of which is arranged at a greater clearance from the two other conveyor disks. In other words, a first conveyor disk and a second conveyor disk situated directly adjacent to the first conveyor disk are spaced apart by a smaller axial clearance than that between the second conveyor disk and a third conveyor disk. The third conveyor disk is situated directly adjacent to the second conveyor disk and arranged on the side of the second conveyor disk that faces away from the first conveyor disk. In this context, "two directly adjacent conveyor disks" means that no other conveyor disk is situated between the two directly adjacent conveyor disks.

In this way, the conveying effect is improved because the two conveyor disks that are only slightly spaced apart in the axial direction form a larger guide surface for the crop than a single conveyor disk.

It is preferred to also provide a fourth conveyor disk that is situated underneath and directly adjacent to the third conveyor disk. The fourth conveyor disk is also spaced apart from the third conveyor disk by a smaller axial clearance than that between the third conveyor disk and the second conveyor disk.

In order to remove the crop from the conveyor on the discharge side, it is preferred to provide a stripper that consists of a flat sheet metal, engages into the space between the first and the second conveyor disks and leaves open small gaps between itself and the first and the second conveyor disks, wherein these gaps are so small that the clearing device no longer leaves any crop stalks between the first and the second conveyor disks. The plane of the stripper extends in a plane that lies parallel to the plane of the first (and the second) conveyor disk. A stripper of this type that consists of a single sheet metal may be analogously arranged between the third and the fourth conveyor disks.

The clearance between the second and the third conveyor disks, in contrast, is greater than the clearance between the first and the second conveyor disks. A generally known stripper that is composed of a first plate, a second plate and an intermediately arranged guide tab may engage into this clearance.

The conveyor disks are preferably mounted concentrically on a rotatable drum. Such a conveyor can be used, in particular, on a mowing and intake device of a machine for harvesting stalk-like crops. The mowing and intake device comprises a lower cutting disk for cutting the plant stalks off the stumps that remain in the ground and an inventive conveyor that is arranged on top thereof and can be set in rotation about a vertical axis. The conveyor may furthermore be used on a machine for picking up crops (e.g., baling press or forage box) that features a pick-up drum fitted with tines. In this case, the inventive conveyor is arranged downstream of the pick-up drum.

BREIF DESCRIPTION OF THE PREFERRED EMBODIMENT

One exemplary embodiment of the invention is illustrated in the drawing and described in greater detail below. In this drawing:

FIG. 1 shows a perspective representation of a mowing and intake device equipped with a conveyor, as well as the regions of a machine for harvesting stalk-like crops situated adjacent thereto.

DETAILED DESCRIPTION OF THE PREFERRED EMBODIMENT

The FIGURE shows a section of a machine 10 for harvesting stalk-like crops, particularly corn. For the harvesting mode, the machine 10 is mounted on an intake channel of a not-shown self-propelled forage harvester that is equipped with pre-compression rollers and moved over a field to be harvested by said forage harvester in a driving direction V in the harvesting mode. In the following description, directional indications such as front and rear are with respect to the forward driving direction V. The machine 10 comprises a mowing and intake device 12 that is composed of a rotatable lower cutting disk 14 and a rotatable conveyor 16 arranged coaxially on top thereof. The conveyor 16 comprises a central, circular cylindrical drum 18 and a total of six conveyor disks 20 to 30 with teeth distributed around their radially outer regions, wherein recesses for accommodating plant stalks are defined between adjacent ones of said teeth. The drum 18 may be composed of a plurality of tubular sections of different diameters, between which the conveyor disks 20 to 30 are respectively arranged. The upper side of the drum 20 is formed by a cup-like cover 32 with outwardly protruding drivers 34.

In contrast to the illustration in FIG. 1, the machine 10 usually comprises a plurality of mowing and intake devices 12 that are arranged laterally adjacent to one another. The crop is respectively transferred to the intake channel of the forage harvester on the rear sides of the mowing and intake devices 12, namely by these mowing and intake devices or in cooperation with cross conveyor drums and/or slope conveyor drums (see DE 195 31 918 A1).

The cutting disk 14 and the conveyor 16 with the conveyor disks 20 to 30 are functionally connected to a gearbox 36 that is driven by the forage harvester via an assigned drive train in the harvesting mode and rotates the cutting disk 14 and the conveyor 16 about a vertical axis (or an axis that is inclined slightly forward with respect to the vertical line), wherein the cutting disk 14 usually rotates at a higher speed than the conveyor 16. The gearbox 36 is mounted on a frame (not-shown) of the machine.

A first conveyor disk 20 and a second conveyor disk 22 situated directly beneath the first conveyor disk are arranged on the upper end of the drum 18. An upper cover disk 38 is arranged between the cover 32 and the first conveyor disk 20. The distance between the first conveyor disk 20 and the second conveyor disk 22 is relatively small such that only a first stripper 40 in the form of a sheet metal plate that lies parallel to the plane of the conveyor disks 20, 22 can fit into the intermediate space between the conveyor disks 20, 22. The third conveyor disk 24 is arranged underneath and spaced apart from the second conveyor disk 22 by a greater distance than the spacing between the first and second conveyor disks 20, 22. A second stripper 42 that is composed of a first plate 44, a second plate 46, and an intermediately arranged guide tab 48 engages in this space. The fourth conveyor disk 26 is arranged, analogous to the first and the second conveyor disks 20, 22, at a slight distance below the third conveyor disk 24. Only a third stripper 50 in the form of a sheet metal plate that lies parallel to the plane of the conveyor disks 24, 26 can fit into this intermediate space between the conveyor disks 24, 26.

The fifth conveyor disk 28 is arranged underneath and spaced apart from the fourth conveyor disk 26 by a distance, similar to the spacing between the second and third conveyor disks 22, 24 and to the spacing between the sixth conveyor disk 30 and the fifth conveyor disk 28, beneath which the sixth conveyor disk 30 located. A fourth stripper 52 that is composed of a first plate, a second plate and an intermediately arranged guide tab engages in the clearance between the fourth and the fifth conveyor disks 26, 28. Analogously, a fourth stripper 54 that is composed of a first plate, a second plate and an intermediately arranged guide tab, but that is realized lower than the second and fourth strippers 42, 52, engages in the clearance between the fifth and the sixth conveyor disks 28, 30.

The first and the second conveyor disks 20, 22 are substantially identical and have radially outer regions defining relatively large teeth, between adjacent ones of which are defined relatively large recesses for accommodating plant stalks. The third and the fourth conveyor disks 24, 26 each have first and second sets of teeth, with each tooth of the first set of teeth having a shape which corresponds to the shape of the teeth of the first and the second conveyor disks 20, 22, and with each tooth of the second set of teeth being a small driver 56 with radial and circumferential dimensions smaller than the teeth of the first set of teeth and being respectively provided between adjacent teeth of the first set of teeth. The teeth of the fifth conveyor disk 28 are smaller and spaced apart by a smaller distance than those of the first to fourth conveyor disks 20 to 26. The teeth of the sixth conveyor disk 30 and the recesses between adjacent teeth, are approximately as large as the teeth and recesses of the first and second conveyor disks 20, 22, but the teeth angle outward and downward in a hook-shaped fashion. The strippers 40, 42, 50, 52 and 54, as well as a cover plate 62 that ends in an upper stripper 60 positioned directly above the first conveyor disk 20 and also carries a rear stripper 64, are mounted on a post 58 that, in turn, is supported on the frame of the machine 10.

One distinction between the inventive conveyor 16 and conventional conveyors used thus far for such machines 10 is the provision of a second and a fourth conveyor disk 22, 26 and a first and a third stripper 40, 50. The added conveyor disks 22, 26 enlarge the surfaces on, with respect to the rotating direction, the front side of the teeth that are available for receiving and transporting away the plants such that the harvest of plants with thin and/or soft stalks is simplified. The strippers 40, 50 lift the plants out of the indentations. The clearance between the strippers 40, 50 and between the respectively adjacent conveyor disks 20 to 26 has such small dimensions that no plant stalks can be accommodated therein (namely also in the whole crop ensilage harvesting of grain plants).

Accordingly, the machine 10 functions as follows. In the harvesting mode, the cutting disk 14 and the drum 18 are set in rotation about the axis by the gearbox 36. Plants standing in a field are separated from the stumps remaining in the ground by the cutting disk 14, [the separated plants] are accommodated in the indentations of the conveyor disks 20 to 30, and are lifted out of the indentations by the strippers 40, 42, 50, 52 and 54 and transported away to the forage harvester.

The invention claimed is:

1. A conveyor (16) comprising a plurality of conveyor disks (20, 22, 24, 26, 28, or 30) having radially outer regions edges, wherein all of said plurality of conveyor disks (20, 22, 24, 26, 28, or 30) are arranged coaxial to one another, wherein all of said plurality of conveyor disks (20, 22, 24, 26, 28, or 30) are rotatable about a common central rotational axis, wherein teeth are distributed around the radially outer regions edges of all of said plurality of conveyor disks (20, 22, 24, 26, 28, 30),
wherein said plurality of conveyor disks (20, 22, 24, 26, 28, 30) comprises:
a first conveyor disk (20),
a second conveyor disk (22) situated directly adjacent to, and beneath, the first conveyor disk (20), and
a third conveyor disk (24) situated directly adjacent to, and beneath, the second conveyor disk (22) and disposed on a side of the second conveyor disk (22) that faces away from the first conveyor disk (20), and
a fourth conveyor disk (26) situated directly adjacent to, and beneath, the third conveyor disk (24);
wherein a first axial clearance is provided between the first conveyor disk (20) and the second conveyor disk (22),
wherein a second axial clearance is provided between the second conveyor disk (22) and the third conveyor disk (24), and
wherein a third axial clearance is provided between the third conveyor disk (24), and
wherein the first axial clearance is smaller than the second axial clearance, but substantially equal to the third axial clearance.

2. The conveyor (16) according to claim 1 further comprising a first stripper (40) made of a flat sheet metal plate extending in a plane parallel to a plane of the first conveyor disk (20), wherein the first stripper (40) extends into a space between the first conveyor disk (20) and the second conveyor disk (22), and wherein open narrow gaps are provided between the first stripper (40) and the first conveyor disk (20) and between the first stripper (40) and the second conveyor disk (22).

3. The conveyor (16) according to claim 2, further comprising a second stripper (42) including a first plate (44), a second plate (46) and an intermediately arranged guide tab (48), wherein the second stripper (42) is engaged in the space between the second and the third conveyor disks (22, 24).

4. The conveyor (16) according to claim 1, wherein at least one of a fifth conveyor disk (28) and a sixth conveyor disk (30) is arranged underneath the fourth conveyor disk (26).

5. The conveyor (16) according to claim 1, characterized by the teeth of the third and fourth conveyor disks each being defined by first and second sets of teeth, with the second set of teeth being drivers (56), with each driver (56) being located in the recess between adjacent teeth of the first set of teeth and having radial and circumferential dimensions smaller than the teeth of the first set of teeth of the third conveyor disk (24).

6. The conveyor (16) according to claim 5, characterized by the fact that said first and second conveyor disks are substantially identical to each other, and said third and fourth conveyor disks are substantially identical to each other.

7. The conveyor (16) according to claim 1, further comprising is rotatable drum (18) wherein the plurality of conveyor disks (20, 22, 24, 26, 28, 30) is concentrically mounted on the rotatable drum (18).

8. A mowing and intake device (12) for a machine (10) for harvesting stalk-like crops, comprising a lower cutting disk (14) and a conveyor (16) in accordance with claim 1 that is arranged above said cutting disk (14) and can be set in rotation about a vertical axis.

* * * * *